US006982423B2

(12) United States Patent
Elgali

(10) Patent No.: US 6,982,423 B2
(45) Date of Patent: Jan. 3, 2006

(54) CT DETECTOR-MODULE HAVING RADIATION SHIELDING FOR THE PROCESSING CIRCUITRY

(75) Inventor: Avner Elgali, Tzur Yigal (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 267 days.

(21) Appl. No.: 10/451,034

(22) PCT Filed: Nov. 20, 2001

(86) PCT No.: PCT/IL01/01068

§ 371 (c)(1), (2), (4) Date: Jun. 18, 2003

(87) PCT Pub. No.: WO03/044563

PCT Pub. Date: May 30, 2003

(65) Prior Publication Data

US 2004/0065839 A1 Apr. 8, 2004

(51) Int. Cl.
*G01T 1/20* (2006.01)

(52) U.S. Cl. ................................................ 250/370.11

(58) Field of Classification Search ........... 250/370.09, 250/370.11; 378/19

See application file for complete search history.

(56) References Cited

U.S. PATENT DOCUMENTS

| | | | | |
|---|---|---|---|---|
| 5,241,576 | A | 8/1993 | Lonn | |
| 5,430,784 | A | 7/1995 | Ribner et al. | |
| 5,802,138 | A | 9/1998 | Glasser et al. | |
| 5,821,541 | A | 10/1998 | Tumer | |
| 5,991,357 | A * | 11/1999 | Marcovici et al. | 378/19 |
| 6,396,898 | B1 * | 5/2002 | Saito et al. | 378/19 |
| 6,700,948 | B2 * | 3/2004 | Hoffman | 378/19 |
| 2002/0085665 | A1 * | 7/2002 | Hoffman et al. | 378/19 |

FOREIGN PATENT DOCUMENTS

| | | | |
|---|---|---|---|
| EP | 0 950 372 | A1 | 10/1999 |
| WO | WO 98/05980 | A1 | 2/1998 |
| WO | WO 01/08224 | A1 | 2/2001 |

* cited by examiner

*Primary Examiner*—Constantine Hannaher
(74) *Attorney, Agent, or Firm*—Thomas M. Lundin

(57) ABSTRACT

A CT detector-module-for detecting X-rays comprising: a matrix of photosensors, each of which generates signals responsive to photons incident thereon; a scintillator mounted over the matrix that converts X-rays incident on the scintillator to photons to which the photosensors are sensitive; an anti-scatter collimator mounted over the scintillator; and electronic circuitry located in close proximity to the photosensors to which each of the photosensors is connected for processing the signals generated by the photosensors; wherein parts of the module are formed from an absorbing material having a high X-ray absorption coefficient and shield the circuitry from radiation.

34 Claims, 4 Drawing Sheets

CT DETECTOR-MODULE HAVING RADIATION SHIELDING FOR THE PROCESSING CIRCUITRY

RELATED APPLICATIONS

The present application is a US National Phase Application of PCT Application No. PCT/IL01/01068, filed on Nov. 20, 2001.

FIELD OF THE INVENTION

The present invention relates to computerized tomography (CT) X-ray imaging, and in particular to methods of shielding electronics used to process signals generated by X-ray detectors in CT imagers.

BACKGROUND OF THE INVENTION

In CT X-ray imaging of a patient, X-rays are used to image internal structure and features of a region of the person's body. The imaging is performed by a CT-imaging system, hereinafter referred to as a "CT-scanner" that images internal structure and features of a plurality of contiguous relatively thin planar slices of the body region using X-rays.

The CT-scanner generally comprises an X-ray source that provides a planar, fan-shaped X-ray beam and an array of closely spaced X-ray detectors that are substantially coplanar with the fan beam and face the X-ray source. The X-ray source and array of detectors are mounted in a gantry so that a person being imaged with the CT-scanner, generally lying on an appropriate support couch, can be positioned within the gantry between the X-ray source and the array of detectors. The gantry and couch are moveable relative to each other so that the X-ray source and detector array can be positioned axially at desired locations along the patient's body.

The gantry comprises a stationary structure referred to as a stator and a rotary element, referred to as a rotor, which is mounted to the stator so that the rotor is rotatable about the axial direction. In third generation CT-scanners the X-ray source and detectors are mounted to the rotor. In fourth generation CT-scanners the detectors are mounted to the stator and form a non-rotating circular array. Angular position of the rotor about the axial direction is controllable so that the X-ray source can be positioned at desired angles, referred to as "view angles", around the patient's body.

To image a slice in a region of a patient's body, the X-ray source is positioned at the axial position of the slice and the X-ray source is rotated around the slice to illuminate the slice with X-rays from a plurality of different view angles. At each view angle, detectors in the array of detectors generate signals responsive to intensity of X-rays from the source that pass through the slice. The signals are processed to determine amounts by which X-rays from the X-ray source are attenuated over various path lengths through the slice that the X-rays traverse in passing though the slice from the X-ray source to the detectors. The amounts by which the X-rays are attenuated are used to determine an X-ray absorption coefficient for material in the slice as a function of position in the slice. The absorption coefficient is used to generate an image of the slice and identify composition and density of tissue in the slice.

The X-ray detectors comprised in a detector array of CT-scanner are generally packaged in a plurality of modules, hereinafter referred to as "CT detector-modules", each of which comprises a plurality of X-ray detectors. Most modern CT-scanners are multi-slice CT-scanners designed to simultaneously image a plurality of slices of a patient. The X-ray detectors in each CT detector-module of a multi-slice scanner are arranged in a rectangular matrix of rows and columns. The X-ray detector matrices of any two CT detector-modules in a CT-scanner are substantially identical and comprise a same number of rows of detectors and a same number of columns of detectors. The modules are positioned one adjacent to and contiguous with the other in a closely packed array with their rows of detectors aligned end to end so that the X-ray detectors form a plurality of long parallel rows of X-ray detectors. The X-ray detectors in each long row of detectors lie on an arc of a circle having its center located substantially at a focal point of the CT-scanner's X-ray source.

A multi-slice scanner can theoretically be operated to simultaneously image a number of slices of a patient up to a maximum number of slices equal to the number of rows of detectors. However, typically, signals from detectors in a multi-slice scanner are combined in accordance with any of various algorithms known in the art to simultaneously image a plurality of slices that is less than the number of rows of detectors. Methods of combining signals from CT detector-modules are described in U.S. Pat. Nos. 5,241,576 and 5,430,784 and PCT publication WO 98/05980, the disclosures of which are incorporated herein by reference.

A prior art multi-slice CT-scanner may, by way of example, comprise 42 CT detector-modules each comprising 8 rows and 16 columns of X-ray detectors. The multi-slice CT-scanner would then have 8 rows of 672 X-ray detectors. Typically, in operation signals from X-ray detectors in two adjacent rows of detectors may be combined so that the CT-scanner normally operates to simultaneously image four slices of a patient.

Electronic components used to process signals from the X-ray detectors in a detector module are generally sensitive to radiation and if exposed to X-rays at intensities measured by the detectors are quickly damaged to an extent that causes them to become non-functional. As a result, electronic components for processing signals from the X-ray detectors in a CT detector-module are usually located at positions removed from the detector module for which intensities of X-rays from the X-ray source are relatively low. In addition, the electronic components are shielded by appropriate radiation shielding. Each detector in a detector module is connected to the module's electronic processing components via a cable over which signals from the detector are transmitted to the processing electronics.

To an extent to which CT detector-modules in a CT-scanner comprise a greater plurality of X-ray detectors and sizes of the detectors decrease, resolution of the scanner can be increased and flexibility in configuring the CT-scanner for different imaging demands is improved. However, as the number of X-ray detectors in a CT detector-module increases, a required number of conductors in a cable connecting the detectors to the processing electronics increases. To accommodate an increased number of conductors, size of the cable, and in particular sizes of connectors that couple the cable to the CT detector-module and to the processing unit increase. However, space available in a CT-scanner for a CT detector-module is limited and the immediate neighborhood of each of the CT-modules in a CT-scanner is crowded. As a result it does not appear feasible to provide required data transmission capacity using conventional cable for CT detector-modules comprising a number of X-ray detectors substantially larger than a number of X-ray detectors typically comprised in prior art CT detector-modules.

A possible alternative to transmitting X-ray detector signals via cable to processing electronics is to locate the electronics in close proximity to the detectors and connect the detectors to the electronics using electrical connections formed using known microfabrication techniques. The processing electronics might, for example, be located on a same substrate as the detectors and/or on a different substrate connected to the detector substrate using microconnectors known in the art. Known microfabrication materials and techniques can provide, in restricted space available in a multi-slice CT-scanner, connectivity between processing circuits and X-ray detectors in the CT-scanner for a substantially greater number of X-ray detectors than can be provided for by cable.

However, it may not have appeared feasible to locate processing electronics for a CT detector-module in close proximity to the module's X-ray detectors. The X-ray detectors in a CT detector-module are densely packed and are closely coupled to a relatively large anti-scattering collimator. The CT detector-modules in a CT-scanner are also, as noted above, closely packed one to the other and neighborhoods of the detector modules are crowded. As a result, it may have appeared in prior art that insufficient space in the neighborhood of the X-ray detectors of a CT detector-module is available to install radiation shielding sufficient to protect radiation sensitive electronic components located in close proximity to the detectors.

SUMMARY OF THE INVENTION

An aspect of some embodiments of the present invention relates to providing a CT detector-module comprising electronic components for processing signals generated by the module's detectors mounted in close proximity to the detectors and having sufficient radiation shielding for protecting the electronic components.

An aspect of some embodiments of the present invention relates to providing a CT detector-module comprising a number of X-ray detectors substantially larger than a number of X-ray detectors generally comprised in prior art CT detector-module In accordance with an embodiment of the present invention, at least some processing electronics for X-ray detectors comprised in a CT detector-modules are mounted in close proximity to the X-ray detectors optionally on a same substrate as the detectors. In accordance with some embodiments of the present invention, the X-ray detectors are located on a first substrate and at least some signal processing electronics for the detectors are optionally located on a second substrate. The two substrates are in close proximity to each other and are connected together for transmission of signals between processing electronics and/or X-ray detectors on the first substrate and processing electronics on the second substrate using one or more of a variety of microconnectors or other suitable connections for transmission of signals.

According to an aspect of some embodiments of the present invention, shielding for the electronics mounted in close proximity to the X-ray detectors of the CT detector-module is provided by forming parts of the module conventionally comprised in the module from a material having a suitably high X-ray absorption coefficient. Generally, parts of a CT detector-module must be machined to high tolerances. The inventor has determined that materials suitable for forming precision parts exist that also have a sufficiently high X-ray absorption coefficient so that parts of a CT detector-module formed from the materials can provide effective radiation shielding to protect processing electronics mounted in close proximity to the module's detectors. By forming parts of a CT detector-module from suitable radiation absorbing shielding-material, sufficient radiation shielding can be packed into the limited space of a CT detector-module, in accordance with an embodiment of the present invention, to protect the electronic processing components. In some embodiments of the present invention, the parts, hereinafter referred to as "shielding parts", of the CT detector-module formed from the shielding material comprise elements of an anti scattering collimator comprised in the module, which is coupled to the X-ray detectors.

In some embodiments of the present invention, additional structural elements, hereinafter "supplementary shielding elements", are mounted in the CT detector-module to provide radiation shielding for the electronics, which is additional to shielding provided by the module's shielding parts. The inventor has found that the supplementary shielding elements can be designed so that they are accommodated in the limited space available for the CT detector-modules.

In accordance with embodiments of the present invention, connections between the X-ray detectors and processing electronics are provided by connectors formed using microfabrication techniques.

By locating processing electronics for a CT detector-module in close proximity to X-ray detectors in the module, on a same substrate on which the X-ray detectors are located or on a substrate closely adjacent to the X-ray detector substrate, connectors for connecting the X-ray detectors to the electronics can be conveniently fabricated using microfabrication techniques. In the limited space available in a CT detector-module and in a neighborhood of a CT detector-module comprised in a CT-scanner, a substantially larger number of X-ray detectors can be connected to processing electronics using microfabricated conductors than can generally be connected to processing electronics using cables as in prior art. As a result, a CT detector-module in accordance with an embodiment of the present invention can comprise substantially more and smaller X-ray detectors than are typically comprised in a prior art CT detector-module. A CT-scanner comprising CT detector-modules in accordance with an embodiment of the present invention, may therefore provide images of higher resolution than is typically provided by a prior art CT-scanner.

There is therefore provided, in accordance with an embodiment of the present invention, a CT detector-module for detecting X-rays comprising: a matrix of photosensors, each of which generates signals responsive to photons incident thereon; a scintillator mounted over the matrix that converts X-rays incident on the scintillator to photons to which the photosensors are sensitive; an anti-scatter collimator mounted over the scintillator; and electronic circuitry located in close proximity to the photosensors to which each of the photosensors is connected for processing the signals generated by the photosensors; wherein parts of the module are formed from an absorbing material having a high X-ray absorption coefficient and shield the circuitry from radiation.

Optionally, the absorbing material has an absorption coefficient for X-rays that is larger than about 35 $cm^{-1}$. Optionally, the absorbing material has an absorption coefficient for X-rays that is larger than about 40 $cm^{-1}$. Optionally, the absorbing material has an absorption coefficient for X-rays is equal to about 43 $cm^{-1}$.

In some embodiments of the present invention, the matrix is formed on a first planar substrate.

In some embodiments of the present invention, the collimator comprises an array of parallel anti scatter plates that are substantially perpendicular to the substrate and which are supported by two legs that are formed from the absorbing material.

In some embodiments of the present invention, a portion of at least one of the legs shields at least a portion of the processing circuitry.

In some embodiments of the present invention, each of the legs has an upright section perpendicular to the substrate and a foot having a region substantially parallel to and in close proximity to the first substrate. Optionally, the thickness of the foot region is greater than about 1.75 mm. Optionally, the thickness of the foot region is about 2 mm.

In some embodiments of the present invention, the circuitry comprises circuitry located on the first substrate and wherein a normal projection of the foot region of at least one of the legs onto the first substrate covers a region of the first substrate on which the circuitry is located. Optionally, a normal projection of the foot region of each leg onto the first substrate covers a different region of the substrate on which the circuitry on the first substrate is located. Optionally, circuitry on the region of the first substrate covered by the normal projection of the foot region of a leg is located between the foot region and the substrate.

In some embodiments of the-present invention, the circuitry comprises circuitry located on a second planar substrate positioned in close proximity to the first substrate. Optionally, the first and second substrates are parallel and the first substrate is located between the second substrate and the scintillator.

In some embodiments of the present invention, a normal projection of the foot region of at least one of the legs onto the second substrate falls on a region of the second substrate on which circuitry on the second substrate is located. Optionally, a normal projection of the foot region of each of the legs onto the second substrate covers a different region of the substrate on which circuitry on the second substrate is located.

In some embodiments of the present invention, the CT detector-module comprises at least one shielding body formed from an absorbing material having a high X-ray absorption coefficient mounted between the first and second substrates so that a normal projection of a portion of the body onto the second substrate falls on a region of the second substrate on which circuitry on the second substrate is located. Optionally, the at least one shielding body comprises two shielding bodies and wherein a projection of a portion of each of the bodies onto the second substrate falls on a different region of the second substrate on which circuitry on the second substrate is located.

In some embodiments of the present invention, the projection of the portion of least one of the shielding bodies and the projection of the portion of a foot region of one of the legs on the second substrate fall on a same region of the second substrate on which circuitry on the second substrate is located.

Optionally, the portion of the shielding body projected onto the second substrate has a thickness along the direction of projection that is greater than about 1 mm. Optionally, the portion of the shielding body projected onto the second substrate has a thickness along the direction of projection that is about 1.5 mm.

In some embodiments of the present invention, the circuitry on the first substrate comprises at least one switching network that receives signals at each of a plurality of input ports and routes received signals to different ones of a plurality of output ports and wherein each photosensor is connected to an input of a switching network of the at least one switching network.

In some embodiments of the present invention, the circuitry on the second substrate comprises at least one processor for processing signals generated by photosensors comprised in the matrix and each of the outputs of a switching network is electrically connected to at least one processor of the at least one processor.

Optionally, the at least one processor amplifies photosensor signals that it receives. Additionally or alternatively, the at least one processor digitizes signals that it receives. In some embodiments of the present invention, the at least one processor determines the log of attenuation of X-rays reaching a photosensor from an X-ray source in a CT-scanner comprising the CT detector-module, responsive to signals that the processor receives from the photosensor.

In some embodiments of the present invention, the matrix comprises at least 256 photosensors. Optionally, the matrix comprises 16 rows and 12 columns of photosensors.

In some embodiments of the present invention, the matrix comprises at least 512 photosensors. Optionally, the matrix comprises 16 rows and 24 columns of photosensors.

In some embodiments of the present invention, a dimension of the matrix parallel to the rows is less than about 2.5 cm.

In some embodiments of the present invention, parts of the module formed from an absorbing material are formed by injection molding the absorbing material.

There is further provided, a CT-scanner comprising a CT detector-module according to an embodiment of the present invention.

BRIEF DESCRIPTION OF FIGURES

Non-limiting examples of embodiments of the present invention are described below with reference to figures attached hereto and listed below. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale.

DESCRIPTION OF EXEMPLARY EMBODIMENTS

Figure 1:
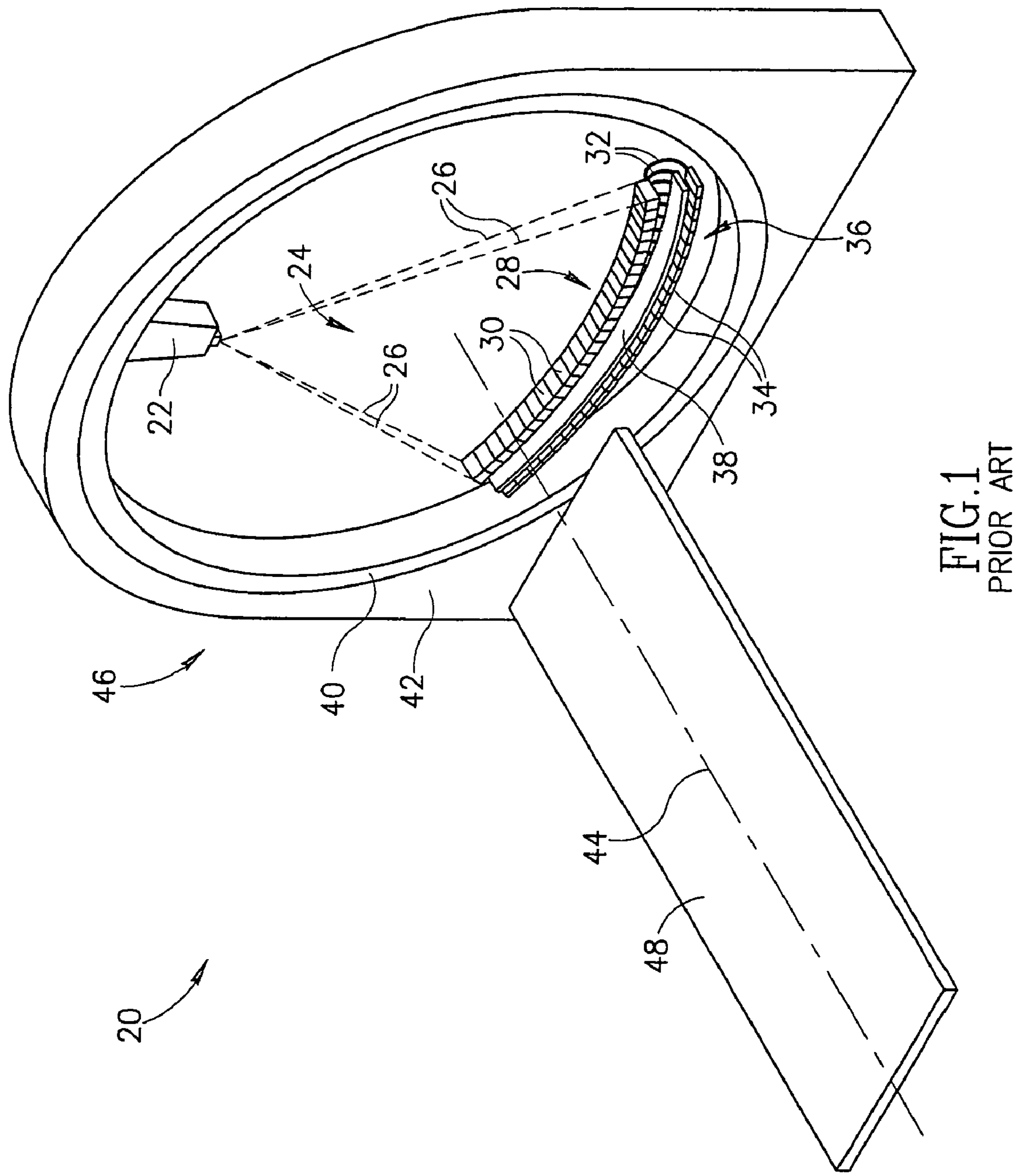
FIG. 1 schematically shows a conventional CT-scanner, in accordance with prior art.

FIG. 1 schematically shows a third generation CT-scanner 20, in accordance with prior art. Only those features and components of CT-scanner 20 germane to the present discussion are shown in FIG. 1.

CT-scanner 20 comprises an X-ray source 22 controllable to provide an X-ray fan-beam 24, schematically indicated by dashed lines 26, and an array 28 of CT detector-modules 30 located opposite the X-ray source. Each CT detector-module 30 comprises a plurality of X-ray detectors (schematically shown in FIG. 2A but not shown in FIG. 1) for sensing intensity of X-rays in fan beam 24. Signals generated by the X-ray detectors in a detector module 30 responsive to X-rays incident on the detectors are transmitted via a cable 32 to a processing unit 34 that comprises electronic components (not shown) for processing the signals.

X-ray source 22 and CT detector-modules 30 are mounted to a rotor 40, which in turn is rotatably mounted to a stator 42 so that the rotor can be rotated about an axis 44. Processing units 34 are also mounted to rotor 40, generally in an array 36 parallel to array 28 and located on a far side of array 28 from X-ray source 22. A sheet 38 of shielding material, such as lead, located between array 28 and array 36 protects electronic components in processing units 30 from damaging radiation. Stator 42 and rotor 40 are components of a gantry 46 of CT-scanner 20.

A patient to be imaged by CT-scanner 20 is supported on a couch 48. Couch 48 is mounted on a suitable pedestal (not shown) and is controllable to be translated axially along axis 44 so as to position a region of the patient's-body to be imaged by CT-scanner 20 inside gantry 46, between X-ray source 22 and array 28. When the region to be imaged is properly positioned inside gantry 46, rotor 40 is controlled to rotate X-ray source 22 around axis 44 to illuminate the region with X-rays from a plurality of view angles. For each view angle, analog signals generated by the X-ray detectors in CT detector-modules 30 responsive to X-rays from X-ray source 22 that pass through the region are transmitted to processing units 34 via cables 32. In processing units 34 the signals are generally amplified, digitized and formatted for transmission to a suitable computer (not shown), which processes the digitized signals it receives to generate an image of the region.

Each X-ray detector in a CT detector-module 30 is connected to processing electronics in processing unit 34 by a different conductor (not shown) in cable 32 that connects the CT detector-module to the processing unit. Maximum possible sizes of cable 32 and connectors (not shown) used to connect the cable to CT detector-module 30 and processing unit 34 are generally determined by spatial constraints in CT-scanner 20. A number of conductors in cable 32 is in turn limited to a maximum number determined by the maximum sizes of cable 32 and/or its associated connectors. The maximum number of conductors sets an upper limit to a number of X-ray detectors that can be comprised in CT detector-module 30, if as in CT-scanner 20 and similar prior art CT-scanners, signals generated by all the X-ray detectors in the module are transmitted via cable 32 to processing unit 34.

Figure 2A:
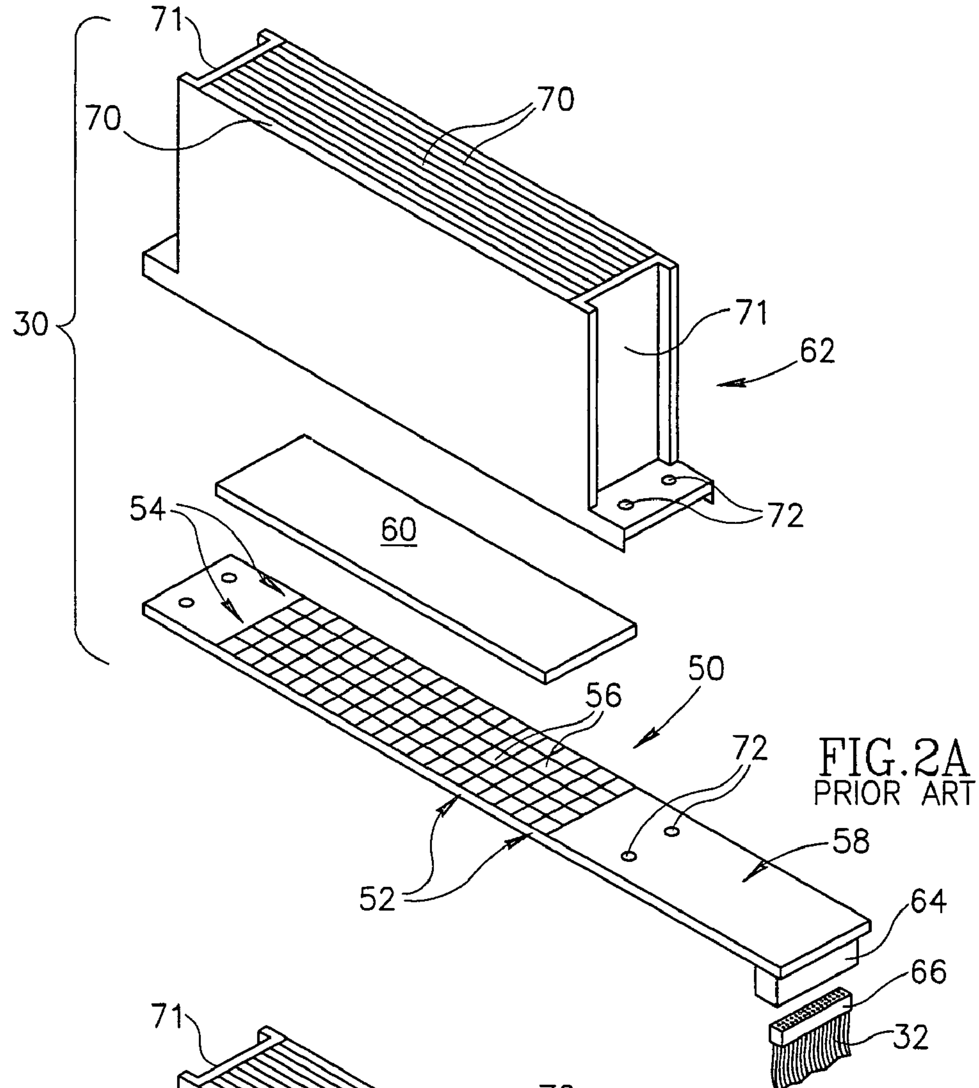
FIGS. 2A and 2B schematically show an exploded perspective view of a CT detector-module and a cross-sectional non-exploded view of the CT detector-module respectively, in accordance with prior art.
Figure 2B:
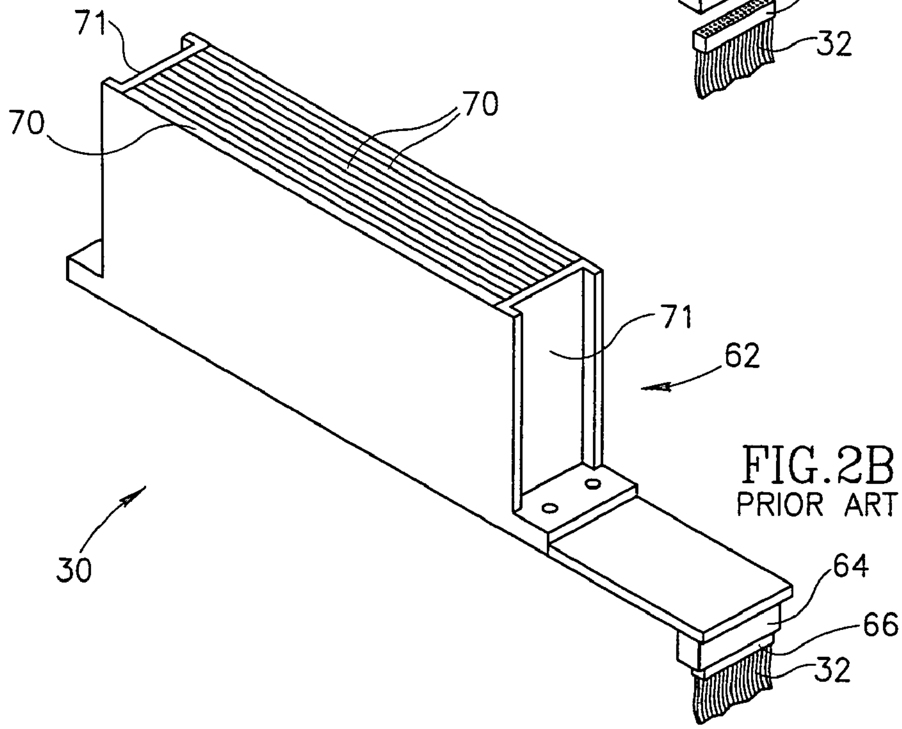

FIGS. 2A and 2B schematically show an exploded, perspective view of a CT detector-module 30 comprised in CT-scanner 20 and a perspective view of the assembled CT detector-module respectively, in accordance with the prior art. Some features and components of CT detector-module 30 shown in the exploded view in FIG. 2A are not normally seen and therefore are not shown in the perspective of the assembled view of the module shown in FIG. 2B.

CT-module 30 comprises a rectangular matrix 50 of rows 52 and columns 54 of photosensors 56, such as photodiodes, mounted to an appropriate substrate 58. A plate 60, hereinafter "scintillator 60", formed from an appropriate scintillation material for converting X-rays to photons to which the photosensors are sensitive, is sandwiched between photosensor matrix 50 and anti scatter collimator 62.

The number of photosensor rows 52 and the number of photosensor columns 54 shown in matrix 50 are chosen for convenience of presentation and are not necessarily equal to a number of rows and a number of columns comprised in a particular prior art CT-scanner. Furthermore, whereas photosensors 56 in photosensor matrix 50 are shown as all being square and having a same size and shape, in some CT detector-modules, photosensors in different rows 52 of matrix 50 have different sizes. Photosensors are also not necessarily square and photosensors may be rectangular as well and a same CT detector-module may comprise photosensors that are square as well as photosensors that are rectangular. A typical prior art CT detector-module may comprise eight rows 52 and sixteen columns 54 of photosensors 56. CT detector-modules 30 are positioned in array 28 of CT-scanner 20 shown in FIG. 1, one adjacent to and contiguous with the other, with their respective photosensor rows 52 aligned end to end and their respective collimators 62 facing X-ray source 22.

Each photosensor 56 on substrate 58 is connected by a conducting element (not shown) in or on substrate 58 to a connector 64 located at an end of the substrate. Connector 64 is used to connect CT detector-module 30 to cable 32, shown in FIG. 1 and partially shown in FIG. 2A, that connects the CT-module to its corresponding processing unit 34. Cable 32 has a connector 66 that couples to connector 64 on substrate 58.

Collimator 62 comprises a pair of legs 71 supporting a plurality of thin parallel anti scatter plates 70 formed from a heavy metal that has a large absorption cross-section for photons. Plates 70 are separated from each other by a distance that is equal to a width of a column 54 of photosensors to a high degree of accuracy. A number of plates 70 in collimator 62 is equal to one more than a number of columns 54 in photosensor matrix 56. Collimator 62 is mounted to substrate 58 with plates 70 parallel to photosensor columns 54 and each plate 70 accurately aligned with an edge of a column 54.

Collimator 62 and substrate 58 are usually formed with a suitable set of matching mounting holes 72 through which bolts and/or pins are inserted to mount collimator 62 to substrate 58. Scintillator 60 is bonded to substrate 58 and matrix 50 using an optical glue.

During operation of CT-scanner 20 to image a region of a patient, X-rays from X-ray source 22 (FIG. 1) that are incident on CT detector-module 30 are converted to photons in scintillator 60, which are sensed by photosensors 56. Each photosensor 56 generates an analog current signal responsive to intensity of photons incident thereon. The signals are amplified and digitized in processor unit 34 (FIG. 1), which then transmits the digitized signals to a suitable computer. In some cases, circuitry in processing unit 34 uses the signals to determine the log of attenuation of X-rays reaching CT detector-module 30 in a solid angle determined by the size of the photosensor 56 and its location relative to the X-ray aperture of X-ray source 22. In these cases the log of the determined attenuation is transmitted to the computer. The computer processes the digital signals it receives to generate an image of the region.

Figure 3:
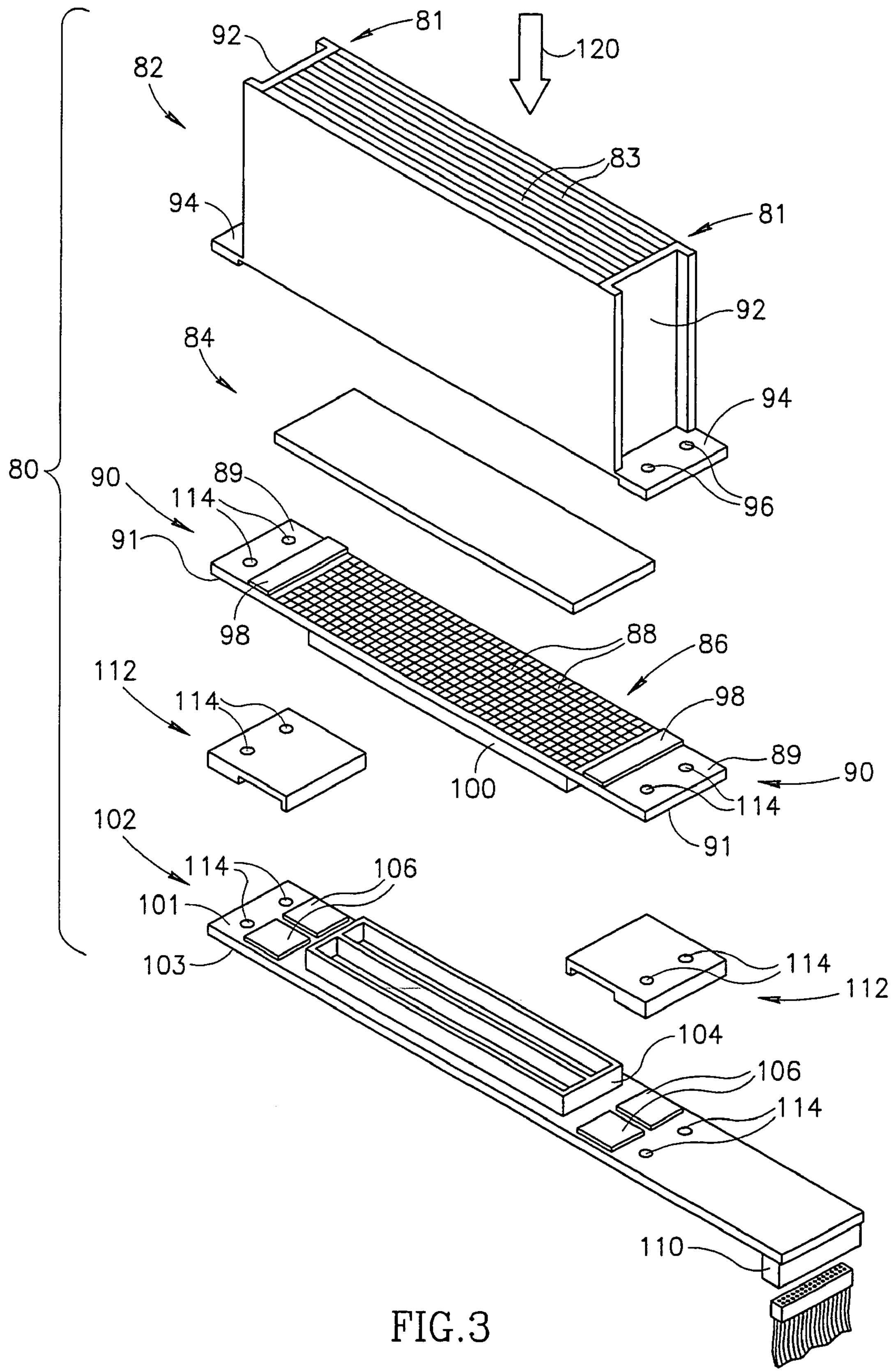
FIG. 3 schematically show an exploded, perspective view of a CT detector-module, in accordance with an embodiment of the present invention.
Figure 4:
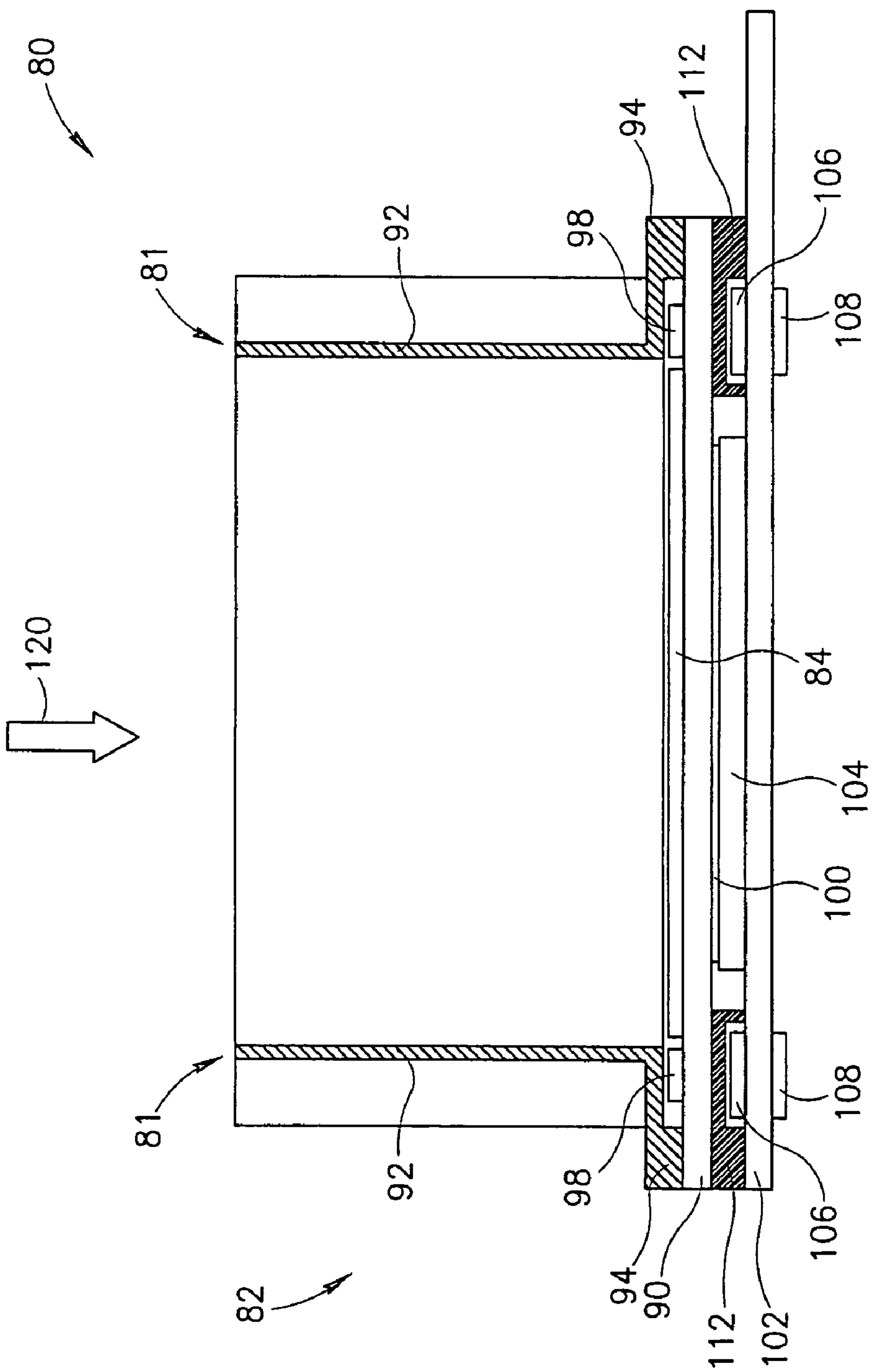
FIG. 4 schematically shows a cross-sectional non-exploded view of the CT detector-module shown in FIG. 3, in accordance with an embodiment of the present invention.

FIGS. 3 and 4 schematically show an exploded, perspective view of a CT detector-module 80 and a cross-sectional non-exploded view of the CT detector-module respectively, in accordance with an embodiment of the present invention.

CT detector-module 80 comprises a collimator 82, a scintillator 84 and a rectangular matrix 86 of photosensors 88 mounted on a top surface 89 of a substrate 90. Collimator 82 comprises a pair of legs 81 supporting a plurality of anti scatter plates 83. Each leg 81 has an upright section 92 and a foot 94 formed with mounting holes 96. Each photosensor 88 is optionally connected by a conductor (not shown) formed, optionally using microfabrication techniques known in the art, in or on substrate 90 to one of two switching networks 98 mounted on the top surface 89 of the substrate. Each switching network 98 is connected by bus lines (not shown) in substrate 90 to a microconnector 100 optionally located on a bottom surface 91 of substrate 90. Each switching network 98 routes analog signals that it receives from photosensors 88 to which it is connected to microconnector 100 via the bus lines connecting the switching network to the micro connector.

Substrate 90 is connected to a substrate 102 by means of a microconnector 104 mounted on a top surface 101 of substrate 102 that matches microconnector 100 on substrate 90. Matching microconnector 104 is connected to processors 106 optionally mounted on surface 101 of substrate 102 and to processors 108 optionally mounted on a bottom surface 103 of the substrate via conductors (not shown) formed in or on the substrate. By way of example, microconnector 104 is connected to four processors 106 located on top surface 101 and four processors 108 mounted on a bottom surface 103 of the substrate. Each processor 108 is located on bottom surface 103 directly "under" a processor 106 located on surface 101. Processors 108 are not shown in FIG. 3. Two processors 108 are shown in the cross section view of CT detector-module 80 shown in FIG. 4.

Signals from photosensors 88 on substrate 90 that are routed by switching networks 98 to microconnector 100 are transmitted to matching connector 104 on substrate 102. Each signal transmitted to matching connector 104 is forwarded from the matching connector to at least one of processors 106 and 108 via a conductor or conductors (not shown) connecting the matching connector to the at least one of processors 106 and 108. Processors 106 and 108 optionally amplify and digitize the signals they receive and further process the signals as might be required. The signals processed by processors 106 and 108 are transmitted after processing to a microconnector 110 optionally mounted on bottom surface 103 of substrate 102. From microconnector 110 the processed signals are transmitted by cable (not shown) to a suitable computer, which generates images from signals that it receives.

It is noted that an amount of data transmitted by processors 106 and 108 is substantially less than an amount of data that is generated and transmitted by photosensors 88. In addition data transmitted by processors 106 and 108 is digital data, which is generally substantially less susceptible to corruption by noise than are the analog signals generated by photosensors 88. Cables and connectors used to transfer data transmitted by processors 106 and 108 therefore do not generally require as much shielding as do cables and connectors used to transfer analog data. As a result microconnector 110 and its associated cable can generally be substantially smaller than a microconnector and associated cable that would be required to transmit data from photosensors 88 to processing circuitry were the photosensors connected to the processing circuitry via a cable as in prior art.

Because switching networks 98 and processors 106 and 108 are mounted in close proximity to photosensors 88, intense X-ray radiation is directed substantially along a direction indicated by a block arrow 120 towards the switching networks and processors when CT detector-module 80 is in use in a CT-scanner. To provide radiation shielding for switching networks 98, processors 106 and processors 108, legs 81 of collimator 82 are formed, in accordance with an embodiment of the present invention, from a structural material having a high absorption coefficient for X-rays and sufficient structural stability so that the material can be used to form precision parts.

In accordance with an embodiment of the present invention, each switching network 98 on substrate 90 is located under a foot 94 of a leg 81 so that a portion of the foot and upright section 92 of the leg are positioned over the switching network. The locations of foot 94 and upright section 92 of a leg 81 relative to switching network 98 over which the leg is located is best seen in the cross-section view of CT detector-module 80 shown in FIG. 4. In the cross section view upright section 92 and foot 94 are shown shaded. Portions of each leg 81 therefore provide radiation shielding for a switching network 98.

Optionally a material from which legs 81 are formed has an absorption coefficient greater than about 35 $cm^{-1}$. Optionally the material has an absorption coefficient greater than about 40 $cm^{-1}$. Optionally thickness of the region of foot 94 overlaying switching network 98 is greater than about 1.75 mm. The inventor has found that a Tungsten Nylon composite marketed by Kanebo Ltd. of Japan under a trade name "NYLON MC102K13" is a suitable material for forming legs 81. The material has a density of about 12 $g/cm^3$, and an absorption coefficient for X-rays of about 43 $cm^{-1}$ for X-ray energies of about 60 keV. The material may conveniently be formed by injection molding to provide legs 81. The material is also machinable and legs 81 can be formed by machining the material as well. Using NYLON MC102K13 to form legs 71, the inventor has found that thickness of the region of foot 94 that overlays a switching network 98 is advantageously about 2 mm, which thickness attenuates X-rays by well over 99.9%. Materials having-absorption coefficients for X-rays other than 43 $cm^{-1}$ may be used in the practice of the present invention and use of such materials and corresponding advantageous thickness for the region of foot 94 overlaying switching network 98 made from such materials, will occur to a person of the art.

In addition, in accordance with an embodiment of the present invention, processors 106 and 108, which are located on substrate 102 are positioned on the substrate so that each processor is also shielded by a portion of foot 94 and upright section 92 of a leg 81. Additional radiation shielding is optionally provided for processors 106 and 108 by each of two supplementary shielding elements 112. Each supplementary shielding element 112 is positioned between substrates 90 and 102 so that a portion of the shielding element lies over a pair of processors 106 and the pair of processor 108 directly under the pair of processors 106. The location of each shielding element 112 relative to processors 106 and 108 that it overlies is best seen in FIG. 4. In FIG. 4 supplementary shielding elements are shown shaded. Supplementary shielding elements 112 are optionally formed from a same material used to form legs 81. For supplementary shielding elements 112 formed from NYLON MC102K13 thickness of the portion of an element 112 that overlays processors 106 is advantageously about 1.5 mm.

Supplementary shielding elements 112 and substrates 90 and 102 are preferably formed with mounting holes 114 that match mounting holes 96 in feet 94 of collimator 81. Bolts and/or pins (not shown) are optionally inserted through mounting holes 96 and 114 to assemble collimator 82 and to align collimator 81 substrates 90 and 102 and supplementary shielding elements 112.

The inventor has determined that by forming legs 81 of collimator 82 and providing the CT detector-module 30 with supplementary shielding elements 112, in accordance with an embodiment of the present invention, effective radiation shielding is provided for switching networks 98 and processors 106 and 108.

By locating processing electronics, such as optionally switching networks 98 and processors 106 and 108, for photosensors 88 in close proximity to the photosensors, in accordance with an embodiment of the present invention, connectivity between the photosensors and the processing electronics is readily provided by conductors formed using known microfabricating techniques. As a result, a substantially larger number of photosensors 88 can be connected to processing electronics than would generally be possible if the photosensors were connected to processing electronics using cables as in prior art. CT detector-module 80, in accordance with an embodiment of the present invention, can therefore comprise a substantially larger number of photosensors than is generally possible with prior art. "Microfabrication connectivity" in a CT detector-module, in accordance with an embodiment of the present invention also tends to make it easier to reduce the size of photosensors 88 and reduce costs of manufacture.

While the number and size of photosensors 88 shown in FIG. 3 is by way of example and chosen for convenience of presentation, their number is greater than the number of photosensors 56 shown in FIG. 2A and their size is smaller than photosensors 56. The number and size of photosensors 88 have been chosen to indicate that a CT detector-module, formed in accordance with an embodiment of the present invention, can comprise more and smaller photosensors than photosensors generally comprised in a prior art CT detector-module. For example, the inventor has produced a CT detector-module in accordance with an embodiment of the present invention, similar to CT detector-module 80 comprising a matrix of photosensors having 24 rows and 16 columns of photosensors. The matrix is approximately 2.2 cm wide and about 5 cm long. Whereas the matrix has a same number of columns as the example of a prior art matrix noted above, the matrix has three times as many rows as the prior art matrix (which has only 8 rows of photosensors). A CT-scanner comprising CT detector-modules in accordance with an embodiment of the present invention similar to CT detector-module 80 may therefore provide images of greater resolution than prior art CT-scanner and be more easily configured to specific imaging demands.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A CT detector-module for detecting X-rays comprising:
- a matrix of photosensors, each of which generates signals responsive to photons incident thereon;
- a scintillator mounted over the matrix that converts X-rays incident on the scintillator to photons to which the photosensors are sensitive;
- an anti-scatter collimator mounted over the scintillator;
- and electronic circuitry located in close proximity to the photosensors to which each of the photosensors is connected for processing the signals generated by the photosensors;
- wherein parts of the module are formed from an absorbing material having a high X-ray absorption coefficient and shield the circuitry from radiation.

2. A CT detector-module according to claim 1 wherein the absorbing material has an absorption coefficient for X-rays that is larger than about 35 $cm^{-1}$.

3. A CT detector-module according to claim 1 the absorbing material has an absorption coefficient for X-rays that is larger than about 40 $cm^{-1}$.

4. A CT detector-module according to claim 1 the absorbing material has an absorption coefficient for X-rays is equal to about 43 $cm^{-1}$.

5. A CT detector-module according to claim 1 wherein the matrix is formed on a first planar substrate.

6. A CT detector-module according to claim 5 wherein the collimator comprises an array of parallel anti scatter plates that are substantially perpendicular to the substrate and which are supported by two legs that are formed from the absorbing material.

7. A CT detector-module according to claim 6 wherein a portion of at least one of the legs shields at least a portion of the processing circuitry.

8. A CT detector-module according to claim 7 wherein each of the legs has an upright section perpendicular to the substrate and a foot having a region substantially parallel to and in close proximity to the first substrate.

9. A CT detector-module according to claim 8 wherein the thickness of the foot region is greater than about 1.75 mm.

10. A CT detector-module according to claim 8 wherein the thickness of the foot region is about 2 mm.

11. A CT detector-module according to claim 8 wherein the circuitry comprises circuitry located on the first substrate and wherein a normal projection of the foot region of at least one of the legs onto the first substrate covers a region of the first substrate on which the circuitry is located.

12. A CT detector-module according to claim 11 wherein a normal projection of the foot region of each leg onto the first substrate covers a different region of the substrate on which the circuitry on the first substrate is located.

13. A CT detector-module according to claim 11 wherein circuitry on the region of the first substrate covered by the normal projection of the foot region of a leg is located between the foot region and the substrate.

14. A CT detector-module according to claim 11 wherein the circuitry comprises circuitry located on a second planar substrate positioned in close proximity to the first substrate.

15. A CT detector-module according to claim 14 wherein the first and second substrates are parallel and the first substrate is located between the second substrate and the scintillator.

16. A CT detector-module according to claim 15 wherein a normal projection of the foot region of at least one of the legs onto the second substrate falls on a region of the second substrate on which circuitry on the second substrate is located.

17. A CT detector-module according to claim 15 wherein a normal projection of the foot region of each of the legs onto the second substrate covers a different region of the substrate on which circuitry on the second substrate is located.

18. A CT detector-module according to claim 14 and comprising at least one shielding body formed from an absorbing material having a high X-ray absorption coefficient mounted between the first and second substrates so that a normal projection of a portion of the body onto the second substrate falls on a region of the second substrate on which circuitry on the second substrate is located.

19. A CT detector-module according to claim 18 wherein the at least one shielding body comprises two shielding bodies and wherein a projection of a portion of each of the bodies onto the second substrate falls on a different region of the second substrate on which circuitry on the second substrate is located.

20. A CT detector-module according to claim 18 wherein the projection of the portion of least one of the shielding bodies and the projection of the portion of a foot region of one of the legs on the second substrate fall on a same region of the second substrate on which circuitry on the second substrate is located.

21. A CT detector-module according to claim 18 wherein the portion of the shielding body projected onto the second substrate has a thickness along the direction of projection that is greater than about 1 mm.

22. A CT detector-module according to claim 18 wherein the portion of the shielding body projected onto the second substrate has a thickness along the direction of projection that is about 1.5 mm.

23. A CT detector-module according to claim 22 wherein the circuitry on the first substrate comprises at least one switching network that receives signals at each of a plurality of input ports and routes received signals to different ones of a plurality of output ports and wherein each photosensor is connected to an input of a switching network of the at least one switching network.

24. A CT detector-module according to claim 23 wherein the circuitry on the second substrate comprises at least one processor for processing signals generated by photosensors comprised in the matrix and each of the outputs of a switching network is electrically connected to at least one processor of the at least one processor.

25. A CT detector-module according to claim 24 wherein the at least one processor amplifies photosensor signals that it receives.

26. A CT detector-module according to claim 24 wherein the at least one processor digitizes signals that it receives.

27. A CT detector-module according to claim 24 and wherein the at least one processor determines the log of attenuation of X-rays reaching a photosensor from an X-ray source in a CT-scanner comprising the CT detector-module, responsive to signals that the processor receives from the photosensor.

28. A CT detector-module according to claim 5 wherein the circuitry comprises circuitry located on a second planar substrate positioned in close proximity to the first substrate.

29. A CT detector-module according to claim 1 wherein the matrix comprises at least 256 photosensors.

30. A CT detector-module according to claim 29 wherein the matrix comprises 16 rows and 12 columns of photosensors.

31. A CT detector-module according to claim 29 wherein a dimension of the matrix parallel to the rows is less than about 2.5 cm.

32. A CT detector-module according to claim 1 wherein the matrix comprises at least 512 photosensors.

33. A CT detector-module according to claim 32 wherein the matrix comprises 16 rows and 24 columns of photosensors.

34. A CT-scanner comprising a CT detector-module according to claim 1.

* * * * *